UNITED STATES PATENT OFFICE.

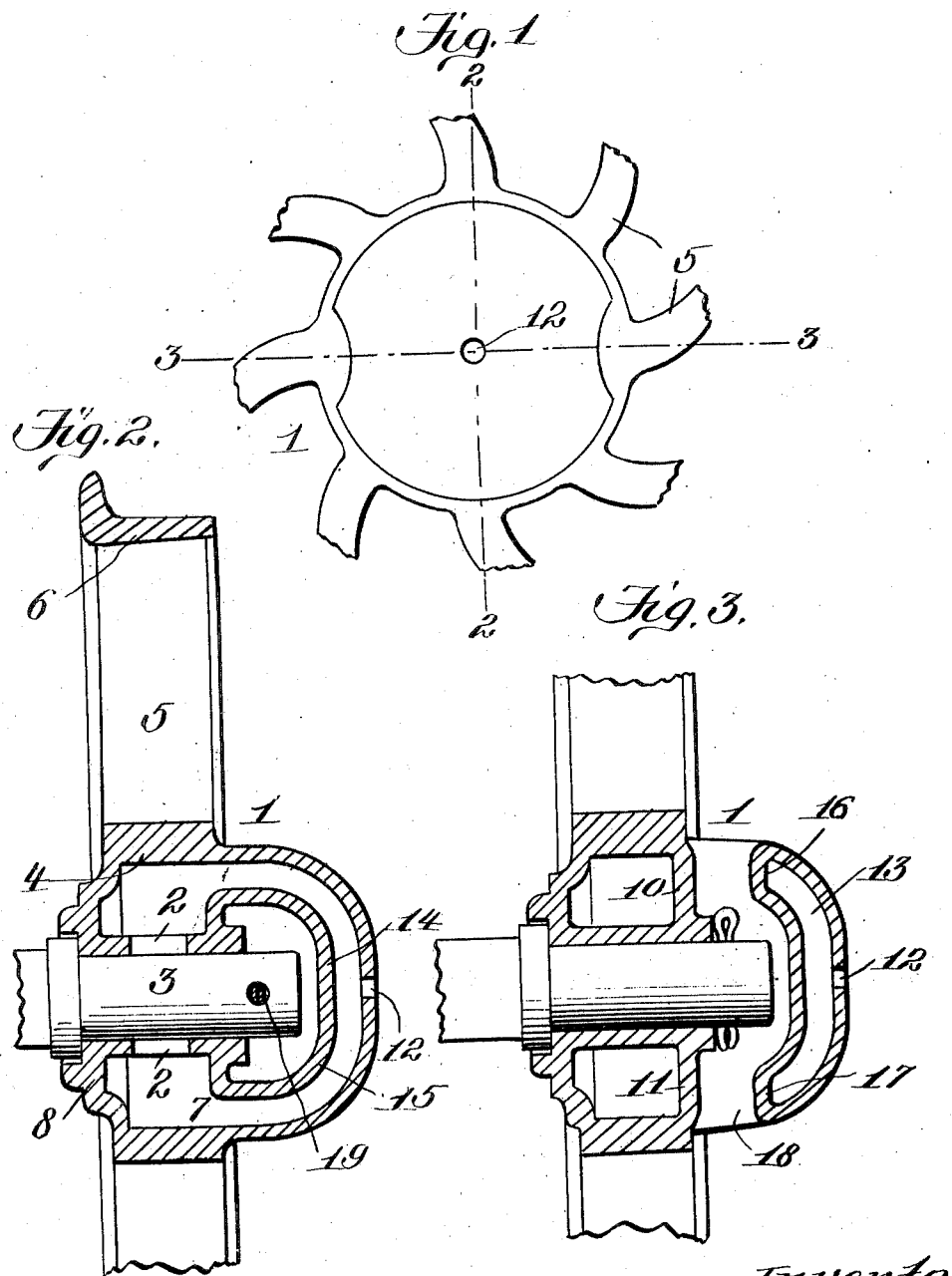

THOMAS G. AULTMAN, OF FAIRMONT, WEST VIRGINIA.

SELF-LUBRICATING WHEEL.

No. 811,356.   Specification of Letters Patent.   Patented Jan. 30, 1906.

Application filed June 22, 1905. Serial No. 266,485.

*To all whom it may concern:*

Be it known that I, THOMAS G. AULTMAN, a citizen of the United States, residing at Fairmont, in the county of Marion and State of West Virginia, have invented new and useful Improvements in Self-Lubricating Wheels, of which the following is a specification.

This invention relates to self-lubricating wheels of that character which revolve loose on the end of a shaft or journal and are held thereon by a linchpin or other means; and the object thereof is to construct the wheel with a lubricant-reservoir and a cap therefor, said wheel and cap being an integral body, and which will contain the same quantity of lubricant as the ordinary cap-wheel and also permit of the removal and replacing of the linchpin without interfering in any manner with the cap.

The invention further aims to provide a self-lubricating wheel which shall be simple in its construction, strong, durable, efficient in its use, formed of an integral body, and comparatively inexpensive to manufacture.

To this end the invention consists of the novel construction, combination, and arrangement of parts hereinafter more specifically described, and illustrated in the accompanying drawings, which form a part of this specification, and wherein is shown the preferred embodiment of the invention.

In the drawings, wherein like reference characters denote corresponding parts throughout the several views, Figure 1 is a front elevation of a self-lubricating wheel constructed in accordance with this invention, the spokes being broken away. Fig. 2 is a longitudinal sectional view on line 2 2, Fig. 1, the spokes being partly broken away and also showing the rim; and Fig. 3 is a like view on line 3 3, Fig. 1.

Referring to the drawings by reference characters, 1 denotes the hub of the wheel, having two or more lubricant-discharge openings 2, through which the lubricant passes to the journal 3 for lubricating the journal and innerface of the hub. Surrounding the hub 1 is a sleeve 4, having the spokes 5 cast integral therewith, and with the spokes 5 is cast the rim 6. The sleeve 4 is of much greater diameter than the hub 1, so as to form a lubricant chamber or reservoir 7. The inner end of said chamber 7 is closed through the medium of a wall 8, which is cast integral at one end with the sleeve 4 and at its other end with the hub 1. At the outer end of the chamber 7 is arranged a pair of diametrically opposite flat closure members 10 and 11 for partly closing said outer end of the chamber 7. The members 10 and 11 are cast integral at one end with the sleeve 4 and at their other ends with the hub 1. That end of the hub 1 and sleeve 4 with which the members 10 and 11 are cast integral has also cast integral therewith, as well as with the members 10 and 11, a cap which is provided with a lubricant-inlet 12, through which a lubricant can be injected into a lubricant-supply passage 13, which terminates in the outer end of the chamber 7. The cap consists of a pair of outwardly-projecting arch-shaped members 14 and 15 and an inner and an outer wall 16 and 17, said walls being substantially convexed in cross-section. The arch-shaped member 14 terminates at one end in one side of the member 10 and at its other end in the other side of the member 10, and the width of said arch-shaped member 14 is equal to the length of the member 10. The arch-shaped member 15 terminates at one end in one side of the member 11 and at its other end in the other side of the arch-shaped member 11, and the width of said arch-shaped member 15 is equal to the length of the member 11. The arch-shaped members 14 and 15, in connection with the members 10 and 11, form a permanently-open passage 18 for the insertion and removal of the linchpin 19 for retaining the wheel upon the journal. In this connection the projecting ends of the pin 19, when the same is inserted in the journal 3, bear against the members 10 and 11, thereby retaining the wheel upon the journal. The inner wall 16 of the cap terminates in the inner sides of the arch-shaped members 14 and 15 and also in the hub 1, and said inner wall 16 forms a chamber for the projecting end of the journal 3. This is evident, owing to the shape of said inner wall 16. The outer wall 17 of the cap terminates in the outer sides of the arch-shaped members 14 and 15 and in the sleeve 4, and the said outer wall 17 is provided with the lubricant-inlet 12. Owing to the arrangement of the outer wall 17 with respect to the inner wall 16 and owing to the size of the outer wall 17, the lubricant-supply passage 13 is formed. By constructing the cap in the manner as set forth and in connection with the members 10 and 11 the outer side of the chamber 7 is closed, and also permits of replenishing said chamber 7 with a lubricant when occasion so requires. The constructing of the inner and outer walls 16 and 17 in the manner as set forth, as well as the arch-shaped members 14 and 15, permits the removal and replacing of the linchpin to be had without interfering with the wheel in any manner.

I am aware of the fact that self-lubricating wheels are provided with removable caps over the end of the axle, said caps being removable, so as to replace and remove a linchpin; but the cap of the herein-described self-lubricating wheel is not removed when it is necessary to replace or remove the linchpin. Furthermore, I am aware that self-lubricating wheels are made with a cap cast integral with the hub, but with one or two openings in the side of the cap, so a person can obtain access to the linchpin. These openings are closed through the medium of plugs; but in the construction of self-lubricating wheels heretofore referred to the openings which enable a person to have access to the linchpin are permanently open and not closed by a plug. Therefore a self-lubricating wheel constructed in accordance with this invention possesses all the advantages of the ordinary cap-wheel and is provided with a lubricant-supply passage which communicates at each end with the lubricant chamber or reservoir 7, said passage 13 formed in the cap of the wheel and the cap of the wheel constructed in such a manner as to form an opening to enable access to be had to the linchpin, said opening being permanently open, and thereby dispensing with the bolts, packing, or plugs, as is now the case, and then, again, the wheel having all of its parts cast integral with one another there is nothing that can get out of order.

Having thus fully described my invention, what I claim as new, and desire to secure by Letters Patent, is—

1. A self-lubricating wheel comprising wheel-body having a lubricating-chamber closed at one end and an integral cap for closing the other end of said chamber, said cap having a permanently-open passage to permit of the insertion and removal of means for securing the wheel to a support without interfering with the cap.

2. In a self-lubricating wheel, a wheel-body comprising a hub having a plurality of outlet-openings, a sleeve surrounding and integral with the hub and forming a lubricant-chamber and a cap projecting away and integral with the hub and sleeve and having a lubricant-feed passage communicating with said chamber.

3. In a self-lubricating wheel, a wheel-body comprising a hub having a plurality of outlet-openings, a sleeve surrounding and integral with the hub and forming a lubricant-chamber and a cap projecting away and integral with the hub and sleeve and having portions thereof forming a passage for the insertion and removal of means for securing the wheel upon a support without interfering with the cap.

4. In a self-lubricating wheel provided with a lubricant-chamber, the combination with the bottom, top and one end wall of said chamber, of closure means for the other end of said chamber and for forming a passage to permit of the insertion and removal of means for securing the wheel upon a support, said closure means consisting of a cap formed of a pair of members integral with and projecting away from one end of said top and bottom walls of said chamber, an inner wall integral with said top and bottom walls of the chamber and with the said members and projecting therefrom, and an outer wall inclosing said inner wall and integral with said members and top and bottom walls of the chamber and projecting away therefrom.

5. In a self-lubricating wheel provided with a lubricant-chamber, the combination with the bottom, top and one end wall of said chamber, of closure means for the other end of said chamber and for forming a passage to permit of the insertion and removal of means for securing the wheel upon a support, said closure means consisting of a cap formed of a pair of members integral with and projecting away from one end of said top and bottom walls of said chamber, an inner wall integral with said top and bottom walls of the chamber and with the said members and projecting therefrom, and an outer wall inclosing said inner wall and integral with said members and top and bottom walls of the chamber and projecting away therefrom, said inner and outer walls of said cap forming a lubricant-passage communicating with the chamber and said outer wall provided with a closable inlet.

6. A self-lubricating wheel consisting of an integral structure provided with a lubricant-chamber and an outwardly-extending closure-cap therefor, said closure-cap having a lubricant-passage communicating with the chamber and further provided with a permanently-open passage to permit of the insertion and removal of a linchpin without interfering with the cap.

7. A self-lubricating wheel, consisting of an integral structure provided with a lubricant-chamber and a closure-cap therefor, said cap having a lubricant-passage communicating with the chamber and further provided with a passage independent of said lubricant-passage and said lubricant-chamber to permit of the insertion and removal of a linchpin without interfering with the cap.

8. A self-lubricating wheel, consisting of an integral structure provided with a lubricant-chamber and a closure-cap therefor, said closure-cap having a lubricant-passage in front of and communicating with said lubricant-chamber and said cap further provided with a passage interposed between said lubricant-passage and said lubricant-chamber, said interposed passage adapted to permit of the insertion and removal of a linchpin without interfering with the cap.

9. A self-lubricating wheel consisting of an integral structure provided with a closed lubricant-chamber and a permanently-open passage to permit of the insertion and removal of a linchpin, said passage independent of said chamber.

10. A self-lubricating wheel consisting of an integral wheel-body provided with a lubricant and a permanently-open passage to permit of the insertion and removal of a linchpin.

In testimony whereof I have hereunto set my hand in presence of two subscribing witnesses.

THOMAS G. AULTMAN.

Witnesses:
 W. H. JOHNSON,
 JAMES L. HALL.